United States Patent
Hirano et al.

(10) Patent No.: US 10,982,330 B2
(45) Date of Patent: Apr. 20, 2021

(54) CONVERSION-COATED METAL PLATE FOR NON-CONDENSED THERMOPLASTIC RESIN BONDING, SURFACE-TREATED METAL PLATE FOR NON-CONDENSED THERMOPLASTIC RESIN BONDING, COMPOSITE MEMBER, AND METHOD FOR PRODUCING CONVERSION-COATED METAL PLATE FOR NON-CONDENSED THERMOPLASTIC RESIN BONDING

(71) Applicant: Kobe Steel, Ltd., Kobe (JP)

(72) Inventors: Yasuo Hirano, Kakogawa (JP); Takeshi Watase, Kakogawa (JP); Tetsuya Yamamoto, Kakogawa (JP)

(73) Assignee: Kobe Steel, Ltd., Kobe (JP)

( * ) Notice: Subject to any disclaimer, the term of this patent is extended or adjusted under 35 U.S.C. 154(b) by 129 days.

(21) Appl. No.: 16/088,716

(22) PCT Filed: Mar. 7, 2017

(86) PCT No.: PCT/JP2017/009024
§ 371 (c)(1),
(2) Date: Sep. 26, 2018

(87) PCT Pub. No.: WO2017/169570
PCT Pub. Date: Oct. 5, 2017

(65) Prior Publication Data
US 2019/0112714 A1    Apr. 18, 2019

(30) Foreign Application Priority Data

Mar. 30, 2016 (JP) .............................. JP2016-067172

(51) Int. Cl.
| | | |
|---|---|---|
| B32B 7/12 | (2006.01) | |
| B32B 15/085 | (2006.01) | |
| C23C 22/48 | (2006.01) | |
| C23C 22/60 | (2006.01) | |
| B05D 7/14 | (2006.01) | |
| C09D 123/08 | (2006.01) | |
| C09J 133/02 | (2006.01) | |
| B29C 45/14 | (2006.01) | |
| B29K 705/12 | (2006.01) | |
| B29L 9/00 | (2006.01) | |

(52) U.S. Cl.
CPC .............. *C23C 22/48* (2013.01); *B05D 7/14* (2013.01); *B29C 45/14336* (2013.01); *B32B 7/12* (2013.01); *B32B 15/085* (2013.01); *C09D 123/0869* (2013.01); *C09J 133/02* (2013.01); *C23C 22/60* (2013.01); *B29K 2705/12* (2013.01); *B29L 2009/003* (2013.01); *B32B 2255/06* (2013.01); *B32B 2255/26* (2013.01); *C23C 2222/20* (2013.01)

(58) Field of Classification Search
None
See application file for complete search history.

(56) References Cited

U.S. PATENT DOCUMENTS

| | | | | |
|---|---|---|---|---|
| 6,552,118 B2* | 4/2003 | Fujita | ........................ | C08F 8/42 106/287.1 |
| 7,476,445 B2* | 1/2009 | Saito | ..................... | C09D 5/084 106/14.05 |
| 8,518,521 B2* | 8/2013 | Aso | ..................... | B29C 45/0005 428/141 |
| 2009/0022981 A1 | 1/2009 | Yoshida et al. | | |
| 2010/0062200 A1* | 3/2010 | Domes | ..................... | B05D 7/14 428/35.8 |
| 2015/0333206 A1* | 11/2015 | Nishijima | ............. | B32B 27/308 136/259 |

FOREIGN PATENT DOCUMENTS

| | | |
|---|---|---|
| JP | 11-100450 A | 4/1999 |
| JP | 2002-103519 A | 4/2002 |
| JP | 2002-348523 A | 12/2002 |
| JP | 2005-75878 A | 3/2005 |
| JP | 2007-76005 A | 3/2007 |
| JP | 2007-269018 A | 10/2007 |
| JP | 2009-249690 A | 10/2009 |
| JP | 2015-196878 A | 11/2015 |
| WO | WO 2007/034773 A1 | 3/2007 |

OTHER PUBLICATIONS

International Search Report dated Apr. 11, 2017, in PCT/JP2017/009024 filed Mar. 7, 2017.
Extended European Search Report dated Nov. 20, 2019 in European Patent Application No. 17774115.4, 5 pages.
English translation of the International Preliminary Report on Patentability dated Oct. 2, 2018 in PCT/JP2017/009024 filed Mar. 7, 2017, 7 pages.

* cited by examiner

*Primary Examiner* — Frank D Ducheneaux
(74) *Attorney, Agent, or Firm* — Oblon, McClelland, Maier & Neustadt, L.L.P.

(57) ABSTRACT

According to one aspect of the present invention, there is provided a chemical conversion coated metal sheet for non-condensed thermoplastic resin bonding, the chemical conversion coated metal sheet including a metal substrate and a chemical conversion coating film disposed on at least one surface of the metal substrate, in which the chemical conversion coating film is obtained by coating the metal substrate with a coating liquid that contains an ethylene-acrylic acid copolymer, colloidal silica, and a silane coupling agent. The ethylene-acrylic acid copolymer has an acrylic acid content of 10 mass % or more and a melt flow rate of 80 g/10 min or less.

8 Claims, No Drawings

CONVERSION-COATED METAL PLATE FOR NON-CONDENSED THERMOPLASTIC RESIN BONDING, SURFACE-TREATED METAL PLATE FOR NON-CONDENSED THERMOPLASTIC RESIN BONDING, COMPOSITE MEMBER, AND METHOD FOR PRODUCING CONVERSION-COATED METAL PLATE FOR NON-CONDENSED THERMOPLASTIC RESIN BONDING

CROSS REFERENCE TO RELATED APPLICATIONS

This application is a National Stage entry under 35 U.S.C. 371 of PCT/JP2017/009024, filed on Mar. 7, 2017, and claims foreign priority to Japanese Patent Application No. 2016-067172, filed on Mar. 30, 2016, the entire contents of which are incorporated herein by reference.

TECHNICAL FIELD

The present invention relates to a chemical conversion coated metal sheet for non-condensed thermoplastic resin bonding, a surface-treated metal sheet for non-condensed thermoplastic resin bonding, and a composite member that are excellent in adhesiveness and chemical resistance, as well as to a method for producing the chemical conversion coated metal sheet for non-condensed thermoplastic resin bonding.

BACKGROUND ART

A composite member in which a metal substrate and a resin molded article are combined via an adhesive is often used in the fields of domestic appliances, information apparatus, architectural materials, and mobile medium materials such as marine vessel and automobile components. It is known in the art that, in the composite member, a water-based chemical conversion coating film containing a resin, colloidal silica, and a silane coupling agent is provided between the metal substrate and the adhesive in order to enhance the bonding force between the metal substrate and the resin molded article provided on the metal substrate.

As such a chemical conversion coating film such as this, Patent Literature 1, for example, discloses a surface-treating coating film formed by applying a surface-treating agent containing an organic resin having an anionic functional group on a surface of a metal sheet or a plated metal sheet, heating and drying, and bringing the resultant into contact with an aqueous solution containing a metal cation.

Also, by Patent Literature 2, the present applicant proposes a chemical conversion coating film formed from a surface-treating composition containing an olefin-α,β-unsaturated carboxylic acid copolymer, an α,β-unsaturated carboxylic acid polymer, colloidal silica, and a silane coupling agent.

It is demanded that a composite member such as described above is excellent not only in the adhesiveness between the adhesive layer and the resin molded article (which may hereafter be simply referred to as adhesiveness) but also in the adhesiveness after the composite member is immersed into a chemical agent (which may hereafter be referred to as chemical resistance).

CITATION LIST

Patent Literature

Patent Literature 1: Japanese Unexamined Patent Publication No. 2009-249690

Patent Literature 2: Japanese Unexamined Patent Publication No. 2007-269018

SUMMARY OF INVENTION

An object of the present invention is to provide a chemical conversion coated metal sheet for non-condensed thermoplastic resin bonding, the chemical conversion coated metal sheet being useful as a material to be formed into a composite member excellent in adhesiveness and chemical resistance.

One aspect of the present invention is a chemical conversion coated metal sheet for non-condensed thermoplastic resin bonding, the chemical conversion coated metal sheet including a metal substrate and a chemical conversion coating film disposed on at least one surface of the metal substrate, characterized in that the chemical conversion coating film is obtained by coating the metal substrate with a coating liquid that contains an ethylene-acrylic acid copolymer, colloidal silica, and a silane coupling agent, and that the ethylene-acrylic acid copolymer has an acrylic acid content of 10 mass % or more and a melt flow rate of 80 g/10 min or less.

The foregoing and other objects, features, and advantages of the present invention will be apparent from the following detailed description.

DESCRIPTION OF EMBODIMENTS

There are cases in which a resin molded article made of a non-condensed thermoplastic resin such as polypropylene is used as the resin molded article to be disposed on a metal substrate. According to the studies made by the present inventors, it has been found out that, in this case, when a composite member is fabricated using a conventional chemical conversion coating film, the adhesiveness between the adhesive layer and the resin molded article may be insufficient. Also, it has been found out that the adhesiveness may sometimes decrease after the composite member is immersed into a chemical agent.

Thus, the present inventors have repeatedly made eager studies in order to provide a chemical conversion coated substrate that can be a material of a composite member being excellent in adhesiveness and chemical resistance. As a result, the present inventors have found out that the composition of the chemical conversion coating film provided on the chemical conversion coated substrate affects the adhesiveness and the chemical resistance, thereby arriving at the concept of the present invention.

Hereafter, embodiments according to the present invention will be described; however, the present invention is not limited to these.

A chemical conversion coated metal sheet for non-condensed thermoplastic resin bonding according to an embodiment of the present invention includes a metal substrate and a chemical conversion coating film disposed on at least one surface of the metal substrate.

[Metal Substrate]

The metal substrate is not particularly limited, and examples thereof include steel sheets such as a non-plated cold-rolled steel sheet, a hot-dip galvanized (GI) steel sheet, a hot-dip galvannealed (GA) steel sheet, and an electrogalvanized (EG) steel sheet as well as an aluminum sheet and a titanium sheet. Among these, a hot-dip galvanized (GI) steel sheet, an electrogalvanized (EG) steel sheet, an aluminum sheet, and a titanium sheet are preferable, and a hot-dip galvannealed (GA) steel sheet is more preferable. The thickness of the metal substrate is not particularly limited; however, the thickness is preferably about 0.3 to 3.2 mm in view of weight reduction of the final products.

[Chemical Conversion Coating Film]

The chemical conversion coating film can be fabricated by using a coating liquid for forming a chemical conversion coating film (hereafter referred to as chemical conversion coating film-forming coating liquid). The chemical conversion coating film-forming coating liquid contains an ethylene-acrylic acid copolymer, colloidal silica, and a silane coupling agent.

<Ethylene-Acrylic Acid Copolymer>

The chemical conversion coating film contains an ethylene-acrylic acid copolymer. The ethylene-acrylic acid copolymer as referred to in the present specification is a copolymer of ethylene and acrylic acid.

In the ethylene-acrylic acid copolymer, the acrylic acid content in the monomers serving as a constituent component is 10 mass % or more, preferably 12 mass % or more, and more preferably 15 mass % or more. When the acrylic acid content is 10 mass % or more, both the adhesiveness and the chemical resistance are enhanced. Also, an upper limit of the acrylic acid content is not particularly limited; however, when the acrylic acid content is too large, an improvement in the adhesiveness and the chemical resistance is not particularly recognized and, on the contrary, the costs disadvantageously increase. From such a viewpoint, the acrylic acid content is preferably 25 mass % or less, more preferably 20 mass % or less, and still more preferably 18 mass % or less. Here, the acrylic acid content in the ethylene-acrylic acid copolymer can be measured by infrared spectroscopy using a spectrophotometer and, when a commercially available product is used, reference may be made to catalog values.

The ethylene-acrylic acid copolymer has a melt flow rate (which may hereafter be referred to as MFR) (190° C., 2.16 kgf) of 80 g/10 min or less, preferably 60 g/10 min or less, more preferably 40 g/10 min or less, and still more preferably 25 g/10 min or less. When the MFR is 80 g/10 min or less, both the adhesiveness and the chemical resistance are enhanced. Also, the MFR is preferably 0.1 g/10 min or more, more preferably 1 g/10 min or more, still more preferably 5 g/10 min or more, and further more preferably 10 g/10 min or more. When the MFR is less than 0.1 g/10 min, there is a fear that the adhesiveness or the chemical resistance may decrease. Here, the MFR of the ethylene-acrylic acid copolymer may be measured in accordance with ASTM D1238, JIS K7210 or ISO 1133 and, when a commercially available product is used, reference may be made to catalog values.

The larger the MFR of the ethylene-acrylic acid copolymer is, the smaller the weight-average molecular weight tends to be. For this reason, the ethylene-acrylic acid copolymer preferably has a weight-average molecular weight (Mw) of 80,000 or more, more preferably 90,000 or more, still more preferably 100,000 or more, and particularly preferably 110,000 or more. When the Mw is 80,000 or more, both the adhesiveness and the chemical resistance are enhanced. Also, an upper limit of the Mw is not particularly limited; however, the Mw is preferably 600,000 or less, more preferably 300,000 or less, and still more preferably 200,000 or less. The Mw of the ethylene-acrylic acid copolymer can be calculated from the value of the MFR using the formula of $Mw=(MFR)^{-(1/3.4)} \times 3.0 \times 10^5$.

As the ethylene-acrylic acid copolymer satisfying the properties such as described above, a commercially available product may be used. Examples of the commercially available products include PRIMACOR (registered trademark) series manufactured by The Dow Chemical Company and NUCREL (registered trademark) series manufactured by Du Pont-Mitsui Polychemicals Co., Ltd.

It is preferable that the aforementioned chemical conversion coating film does not contain a thermoplastic resin other than the ethylene-acrylic acid copolymer; however, the chemical conversion coating film may contain a thermoplastic resin other than the ethylene-acrylic acid copolymer to such an extent that the effects of the present invention are not deteriorated. Examples of the other thermoplastic resin include polyolefin resins such as polyethylene, polypropylene, polybutene, polymethylpentene, copolymer of α-olefin and ethylene or propylene, ethylene-vinyl acetate copolymer, ethylene-methacrylic acid copolymer, ethylene-maleic anhydride copolymer, and propylene-maleic anhydride copolymer; polystyrene resin, acrylonitrile-butadiene-styrene (ABS) copolymer, acrylonitrile-EPDM (ethylene-propylene-diene rubber)-styrene (AES) copolymer, acrylic resin, polybutadiene, polyacetal resin, polyether resin, polyvinyl acetate, polyvinyl chloride, and polyvinylidene chloride.

The content of the ethylene-acrylic acid copolymer in 100 mass % of the total resin contained in the chemical conversion coating film is preferably 80 mass % or more, more preferably 90 mass % or more, still more preferably 99.91 mass % or more, particularly preferably 99.95 mass % or more, and most preferably 100 mass % (which means that the resin contained in the chemical conversion coating film is an ethylene-acrylic acid copolymer only).

Also, the content of the ethylene-acrylic acid copolymer relative to the chemical conversion coating film is preferably 20 mass % or more, and more preferably 30 mass % or more. Further, the content of the ethylene-acrylic acid copolymer relative to the chemical conversion coating film is preferably 80 mass % or less, and more preferably 70 mass % or less.

When the content of the ethylene-acrylic acid copolymer is too small, the film-forming property of the chemical conversion coating film tends to decrease. On the other hand, when the content of the ethylene-acrylic acid copolymer is too large, the corrosion resistance tends to decrease.

Here, in the Patent Literature 1, NUCREL (registered trademark) N5130H manufactured by Du Pont-Mitsui Polychemicals Co., Ltd. (acrylic acid content: 20 mass %, MFR at 190° C.: 300 g/10 min) is used as an ethylene-unsaturated carboxylic acid copolymer. Also, in the Patent Literature 2, PRIMACOR (registered trademark) 5990I manufactured by The Dow Chemical Company (acrylic acid content: 20 mass %, MFR at 190° C.: 1300 g/10 min, weight-average molecular weight: 20000) or AC5120 manufactured by Honeywell International Inc. (acrylic acid content: 15 mass %, weight-average molecular weight: 5000) is used as an ethylene-unsaturated carboxylic acid copolymer. However, composite members provided with a chemical conversion coated metal sheet using the aforementioned ethylene-unsaturated carboxylic acid copolymer all have too large an MFR of the ethylene-unsaturated carboxylic acid copolymer, so that the adhesiveness and the chemical resistance are insufficient.

<Colloidal Silica>

The chemical conversion coating film contains colloidal silica. The colloidal silica produces an effect of enhancing the corrosion resistance of the chemical conversion coating film. As the colloidal silica, "XS", "SS", "40", "N", "UP", and others of "SNOWTEX (registered trademark)" series (colloidal silica manufactured by Nissan Chemical Industries, Ltd.) are suitably used. In particular, "SNOWTEX (registered trademark) 40" having a surface area average particle size of about 10 to 20 nm is suitably used.

The amount of the colloidal silica is preferably 30 parts by mass or more, more preferably 35 parts by mass or more, and still more preferably 40 parts by mass or more, relative to 100 parts by mass of the solid components of the chemical conversion coating film-forming coating liquid. Also, the amount of the colloidal silica is preferably 60 parts by mass or less, more preferably 55 parts by mass or less, and still more preferably 50 parts by mass or less, relative to 100 parts by mass of the solid components of the chemical conversion coating film-forming coating liquid.

The content of the colloidal silica relative the chemical conversion coating film is preferably 30 mass % or more, more preferably 35 mass % or more, and still more preferably 40 mass % or more. The content of the colloidal silica relative the chemical conversion coating film is preferably 60 mass % or less, more preferably 55 mass % or less, and still more preferably 50 mass % or less.

When the content of the colloidal silica is too small, the corrosion resistance tends to decrease. On the other hand, when the content of the colloidal silica is too large, the film-forming property of the chemical conversion coating film tends to decrease, or the adhesive strength tends to decrease.

<Silane Coupling Agent>

The chemical conversion coating film-forming coating liquid contains a silane coupling agent. The silane coupling agent can improve the adhesion of the chemical conversion coating film to the metal substrate. Specific examples of the silane coupling agent include amino-group-containing silane coupling agents such as γ-aminopropyltrimethoxysilane, γ-aminopropyltriethoxysilane, N-(β-aminoethyl)-γ-aminopropyltrimethoxysilane, and N-(β-aminoethyl)-γ-aminopropylmethyldimethoxysilane; glycidoxy-group-containing silane coupling agents such as γ-glycidoxypropyltrimethoxysilane, γ-glycidoxypropylmethyldimethoxysilane, γ-glycidoxypropyltriethoxysilane, and γ-glycidoxymethyldimethoxysilane; vinyl-group-containing silane coupling agents such as vinyltrimethoxysilane, vinyltriethoxysilane, and vinyltris(β-methoxyethoxy)silane; methacryloxy-group-containing silane coupling agents such as γ-methacryloxypropyltrimethoxysilane; mercapto-group-containing silane coupling agents such as γ-mercaptopropyltrimethoxysilane and γ-mercaptopropylmethyldimethoxysilane; and halogen-group-containing silane coupling agents such as γ-chloropropylmethoxysilane and γ-chloropropyltrimethoxysilane. Among these, the silane coupling agent is preferably an amino-group-containing silane coupling agent. These silane coupling agents may be used either alone or in combination of two or more kinds. Among these, an amino-group-containing silane coupling agent and a glycidoxy-group-containing silane coupling agent are preferable, and an amino-group-containing silane coupling agent is more preferable, from the viewpoint of providing a good adhesiveness.

The amount of the silane coupling agent is preferably 1 part by mass or more, more preferably 3 parts by mass or more, and still more preferably 5 parts by mass or more, relative to 100 parts by mass of the solid components of the chemical conversion coating film-forming coating liquid. The amount of the silane coupling agent is preferably 25 parts by mass or less, more preferably 20 parts by mass or less, and still more preferably 15 parts by mass or less, relative to 100 parts by mass of the solid components of the chemical conversion coating film-forming coating liquid. When the amount of the silane coupling agent is too small, the adhesive strength tends to decrease. On the other hand, when the amount of the silane coupling agent is too large, no improvement in strength is seen, and the costs tend to increase.

As the silane coupling agent, a commercially available product can be used as well. Examples of suitably usable silane coupling agents include KBM-903 (3-aminopropyltrimethoxysilane) manufactured by Shin-Etsu Silicone Co., Ltd., Z-6011 (3-aminopropyltriethoxysilane) manufactured by Dow Corning Toray Co., Ltd., and Z-6020 (3-(2-aminoethyl)aminopropyltrimethoxysilane) manufactured by Dow Corning Toray Co., Ltd.

<Coating Amount of Chemical Conversion Coating Film>

The coating amount of the chemical conversion coating film is preferably 0.05 $g/m^2$ or more, more preferably 0.1 $g/m^2$ or more, and still more preferably 0.2 $g/m^2$ or more, in terms of dry mass. The coating amount of the chemical conversion coating film is preferably 5 $g/m^2$ or less, more preferably 3 $g/m^2$ or less, and still more preferably 2 $g/m^2$ or less, in terms of dry mass. When the coating amount of the chemical conversion coating film is out of this range, there is a fear that the adhesive strength to the resin molded article may decrease.

<Method for Forming Chemical Conversion Coating Film>

The chemical conversion coating film is formed by applying a chemical conversion coating film-forming coating liquid containing the ethylene-acrylic acid copolymer, the colloidal silica, and the silane coupling agent onto at least one surface of a metal substrate. At the time of forming the chemical conversion coating film, other publicly known additives may be added into the chemical conversion coating film-forming coating liquid. A method for forming the chemical conversion coating film on the metal substrate is not particularly limited, and conventional publicly known application methods can be adopted. For example, the chemical conversion coating film-forming coating liquid may be applied onto one surface or both surfaces of a metal substrate with use of the roll coater method, the spray method, the curtain flow coater method, or the like, followed by heating and drying. The heating and drying temperature is not particularly limited; however, since the chemical conversion coating film-forming coating liquid is water-based, it is desirable to carry out heating for several ten seconds to several minutes at a temperature of around 100° C. at which water evaporates.

The aforementioned chemical conversion coated metal sheet is a chemical conversion coated metal sheet that is useful as a material to be formed into a composite member excellent in adhesiveness and chemical resistance.

[Surface-Treated Metal Sheet]

The chemical conversion coated metal sheet can be turned into a surface-treated metal sheet for non-condensed thermoplastic resin bonding by disposing a later-mentioned adhesive layer made of an adhesive on a surface of the chemical conversion coating film provided in the chemical conversion coated metal sheet. In other words, the surface-treated metal sheet includes the chemical conversion coated metal sheet and an adhesive layer disposed on a surface of the chemical conversion coating film in the chemical conversion coated metal sheet. The adhesive layer may be provided over the whole surface of the chemical conversion coating film or may be provided at necessary parts on the surface of the chemical conversion coating film. When the adhesive layer is provided on a part of the surface of the chemical conversion coating film, the adhesive layer may be provided, for example, in a shape of several lines or in a dotted shape. The adhesive layer is preferably one having an excellent adhesiveness to a later-mentioned resin molded article that is combined with the surface-treated metal sheet. Because of being provided with the chemical conversion coated metal sheet, such a surface-treating metal sheet is a surface-treated metal sheet that is useful as a material to be formed into a composite member excellent in adhesiveness and chemical resistance.

<Adhesive>

The adhesive is preferably an adhesive containing a resin having a polar group (hereafter referred to as a polar-group-containing resin). Also, the adhesive is preferably a hot-melt adhesive.

The polar-group-containing resin is preferably at least one of a modified polyolefin resin, a polyester resin, and a modified polyurethane resin, and more preferably contains a modified polyolefin resin, and still more preferably is a modified polyolefin resin.

Examples of the polyolefin resin serving as a raw material of the modified polyolefin resin include resins such as polyethylene, polypropylene, polybutene, polymethylpentene, copolymer of α-olefin and ethylene or propylene, ethylene-vinyl acetate copolymer, ethylene-acrylic acid copolymer, ethylene-methacrylic acid copolymer, ethylene-maleic anhydride copolymer, and propylene-maleic anhydride copolymer, and these may be used either alone or in combination of two or more kinds. From the viewpoint of suppressing the peeling-off between the chemical conversion coating film and the adhesive layer, the polyolefin resin preferably contains a polypropylene resin, and more preferably is a polypropylene resin.

The polypropylene resin may be a homopolypropylene (homopolymer of propylene) or may be a copolymer of propylene with one or more kinds selected from the group consisting of ethylene, another α-olefin, and a vinyl compound. The other α-olefin is preferably an α-olefin having a carbon number of 4 to 18, and examples thereof include 1-butene, isobutene, 1-pentene, 4-methyl-1-pentene, 1-hexene, 1-octene, 1-decene, and 1-dodecene. The polypropylene resin is preferably a homopolypropylene in view of the adhesion between the chemical conversion coating film and the adhesive layer.

As the modified polyolefin resin (acid-modified polyolefin resin), a commercially available product may be used. Examples of the commercially available products include "UNISTOLE (registered trademark)" series, "NOVATEC (registered trademark)" series and "WINTEC (registered trademark)" series manufactured by Japan Polypropylene Corporation, and "Prime Polypro (registered trademark)" series manufactured by Prime Polymer Co., Ltd.

The modified polyolefin resin can be obtained by modifying a polyolefin resin using a compound having a polar group. The compound having a polar group is preferably at least one of an oxygen-containing compound and a nitrogen-containing compound and may be, for example, a compound containing a hydroxyl group, carboxyl group, epoxy group, acid anhydride group, amino group, an amide group or the like. The compound having a polar group is more preferably an oxygen-containing compound, and still more preferably is an acid-anhydride-group-containing compound. The modified polyolefin resin can be produced by subjecting a compound having a polar group to graft polymerization or block polymerization with a polyolefin resin in accordance with a conventional method. The modified polyester resin and the modified polyurethane resin can be obtained by a method similar to that of the modified polyolefin resin.

Examples of the polyester resin include polyethylene terephthalate, polybutylene terephthalate, polypropylene terephthalate as well as copolymers, mixtures, and acid-modified products of these.

It is preferable that the aforementioned adhesive layer does not contain a thermoplastic resin other than the polar-group-containing resin; however, the adhesive layer may contain a thermoplastic resin other than the polar-group-containing resin to such an extent that the effects of the present invention are not deteriorated. Examples of the other thermoplastic resin include polystyrene resin, acrylonitrile-butadiene-styrene (ABS) copolymer, acrylonitrile-EPDM-styrene (AES) copolymer, acrylic resin, polybutadiene, polyacetal resin, polyether resin, polyvinyl acetate, polyvinyl chloride, and polyvinylidene chloride. These may be used either alone or in combination of two or more kinds.

With regard to 100 mass % of the total resin contained in the adhesive, the content of the polar-group-containing resin is preferably 80 mass % or more, more preferably 90 mass % or more, still more preferably 99.91 mass % or more, particularly preferably 99.95 mass % or more, and most preferably 100 mass % (which means that the resin contained in the adhesive is a polar-group-containing resin only).

When the resin molded article is polypropylene, the adhesive is preferably an adhesive for polypropylene. Specific examples of suitable adhesives include acid-modified polypropylene adhesive and chlorinated polypropylene adhesive.

The modified polypropylene can be produced, for example, by addition of maleic anhydride to polypropylene.

As the modified polypropylene, a commercially available product may be used. Examples of the commercially available products include "UNISTOLE (registered trademark)" series, "NOVATEC (registered trademark)" series and "WINTEC (registered trademark)" series manufactured by Japan Polypropylene Corporation, and "Prime Polypro (registered trademark)" series manufactured by Prime Polymer Co., Ltd. The polypropylene may be a homopolymer or a random copolymer in which a small amount (for example, 4 mass % or less) of ethylene is copolymerized.

As described above, the adhesive is preferably a hot-melt adhesive. The hot-melt adhesive can be applied by a publicly known method and can be applied, for example, in a powder state onto the surface of a chemical conversion coated metal sheet. Also, a solution obtained by dissolving an adhesive into an organic solvent or a water dispersion obtained by dispersing an adhesive into water may be applied onto a chemical conversion coated metal sheet. As the hot-melt adhesive, acid-modified polypropylene adhesive "UNISTOLE (registered trademark)" series manufactured by Mitsui Chemicals, Inc., for example, can be used. After application of the adhesive, the resultant is heated for about 1 to 3 minutes at a temperature suitable for the type of the adhesive (for example, about 180 to 230° C.).

The thickness of the adhesive layer is not particularly limited; however, the adhesive layer preferably has a thickness of about 5 to 40 µm, more preferably 10 to 30 µm, after drying. When the thickness of the adhesive layer is smaller than 5 µm, there is a fear that the adhesive strength to the resin molded article may decrease. When the thickness of the adhesive layer exceeds 40 µm, no particular improvement in the adhesive strength is recognized and, on the contrary, the costs disadvantageously increase.

[Composite Member]

The surface-treated metal sheet is used by being combined with a resin molded article (resin layer), whereby a composite member is obtained in which a resin layer is provided on the adhesive layer in the surface-treated metal sheet. In other words, the composite member includes the surface-treated metal sheet and the resin layer disposed on the adhesive layer in the surface-treated metal sheet. At this time, when processing is needed in the composite member, it is possible to use a surface-treated metal sheet in which the adhesive layer is provided after the chemical conversion coated metal sheet is press-molded into an intended shape, or one in which a surface-treated metal sheet having an adhesive layer provided on the chemical conversion coated metal sheet is press-molded into an intended shape. Further, the composite member is obtained by putting the surface-treated metal sheet into a mold of an injection molding machine, performing mold clamping, injecting a molten resin into the mold, and allowing the resin to be cooled and solidified. It goes without saying that the surface-treated metal sheet may be combined with the resin layer by the press-molding method; however, it is preferable to adopt the injection molding method in order to make use of the advantages of short time and high efficiency of the injection molding.

The conditions for the injection molding may be suitably changed in accordance with the type of the resin constituting the molded article. One example of the conditions for the case in which the resin molded article is polypropylene may be such that the cylinder temperature is 230 to 250° C.; the mold temperature is 45 to 55° C.; the injection holding time is 5 to 8 seconds; and the cooling time is about 20 to 30 seconds. When injection molding is carried under these conditions, a composite member in which the resin layer and the surface-treated metal sheet are firmly bonded to each other can be obtained.

The composite member thus obtained is excellent in adhesiveness and chemical resistance because of being provided with the surface-treating coating film.

<Resin Layer>

The resin layer contains a non-condensed thermoplastic resin. Examples of the non-condensed thermoplastic resin include polyolefins such as polyethylene, polypropylene, polybutene, polymethylpentene, copolymer of α-olefin and ethylene or propylene, ethylene-vinyl acetate copolymer, ethylene-acrylic acid copolymer, ethylene-methacrylic acid copolymer, ethylene-maleic anhydride copolymer, and propylene-maleic anhydride copolymer; polystyrene, acrylonitrile-butadiene-styrene (ABS) copolymer, acrylonitrile-EPDM-styrene (AES) copolymer, acrylic resin, polybutadiene, polyacetal, polyether, polyvinyl acetate, polyvinyl chloride, and polyvinylidene chloride, and these may be used either alone or in combination of two or more kinds. The non-condensed thermoplastic resin preferably contains a polyolefin, more preferably contains polypropylene, and still more preferably is polypropylene.

In order to enhance the strength of the composite member, the resin layer may contain reinforcing fibers such as glass fibers or carbon fibers at about 5 to 60 mass %. Further, publicly known additives such as various kinds of pigments and dyes, flame retardants, antimicrobial agents, antioxidants, plasticizers, and lubricants may be added.

[Physical Properties of Composite Member]
(Adhesiveness)

The adhesive strength $A_1$ of the composite member is preferably 11 MPa or more, more preferably 11.5 MPa or more. A method of measuring the adhesive strength will be described later.

(Chemical Resistance)

In the present specification, the chemical resistance refers to a value obtained by dividing an adhesive strength $A_2$, which is measured after the composite member is immersed into a chemical agent for 168 hours, by the aforementioned adhesive strength $A_1$ (hereafter, this value will be referred to as $A_2/A_1$). When the chemical agent is 50% ethanol, the value $A_2/A_1$ is preferably 86% or more. Also, when the chemical agent is 10% aqueous solution of sodium chloride, the value $A_2/A_1$ is preferably 84% or more, more preferably 85% or more.

While the present specification discloses various modes of techniques as described above, principal techniques among these will be summarized as follows.

One aspect of the present invention is a chemical conversion coated metal sheet for non-condensed thermoplastic resin bonding, the chemical conversion coated metal sheet including a metal substrate and a chemical conversion coating film disposed on at least one surface of the metal substrate, characterized in that the chemical conversion coating film is obtained by coating the metal substrate with a coating liquid that contains an ethylene-acrylic acid copolymer, colloidal silica, and a silane coupling agent, and that the ethylene-acrylic acid copolymer has an acrylic acid content of 10 mass % or more and a melt flow rate of 80 g/10 min or less.

Also, in the chemical conversion coated metal sheet for non-condensed thermoplastic resin bonding, the content of the ethylene-acrylic acid copolymer is preferably 99.91 mass % or more of the total resin contained in the chemical conversion coating film.

Further, in the chemical conversion coated metal sheet for non-condensed thermoplastic resin bonding, the ethylene-acrylic acid copolymer preferably has a weight-average molecular weight of 80,000 or more.

Also, in the chemical conversion coated metal sheet for non-condensed thermoplastic resin bonding, the coating amount of the chemical conversion coating film is preferably 0.05 to 5 g/m$^2$ in terms of dry mass.

Another aspect of the present invention is a surface-treated metal sheet for non-condensed thermoplastic resin bonding, the surface-treated metal sheet including a chemical conversion coated metal sheet for non-condensed thermoplastic resin bonding described above and an adhesive layer disposed on a part or a whole of the surface of the chemical conversion coating film in the chemical conversion coated metal sheet for non-condensed thermoplastic resin bonding, the adhesive layer being made of an adhesive containing a resin having a polar group.

Also, another aspect of the present invention is a composite member including a surface-treated metal sheet for non-condensed thermoplastic resin bonding described above and a resin layer disposed on the adhesive layer in the surface-treated metal sheet for non-condensed thermoplastic resin bonding, the resin layer containing a non-condensed thermoplastic resin.

Further, in the composite member, the non-condensed thermoplastic resin preferably contains a polyolefin resin.

Also, another aspect of the present invention is a method for producing a chemical conversion coated metal sheet for non-condensed thermoplastic resin bonding described above, the method being characterized by including a step of forming the chemical conversion coating film through applying a chemical conversion coating film-forming coating liquid containing the ethylene-acrylic acid copolymer, the colloidal silica, and the silane coupling agent onto at least one surface of the metal substrate.

According to the present invention, a chemical conversion coated metal sheet for non-condensed thermoplastic resin bonding useful as a material to be formed into a composite member excellent in adhesiveness and chemical resistance can be formed by using a chemical conversion coating film containing the predetermined ethylene-acrylic acid copolymer. In other words, when a composite member combined with a non-condensed thermoplastic resin is produced by using this chemical conversion coated metal sheet, a composite member excellent in adhesiveness and chemical resistance can be obtained. Accordingly, the chemical conversion coated metal sheet can be used in a box body or an interior/exterior component of an automobile or domestic appliance, an outer plate member of furniture made of steel, an architectural material, or the like.

Also, according to the present invention, there is provided a surface-treated metal sheet in which an adhesive layer is provided on a surface of the chemical conversion coated metal sheet for non-condensed thermoplastic resin bonding. Further, with use of this surface-treated metal sheet, a composite member combined and integrated with a resin can be provided.

Further, according to the present invention, there is provided a composite member excellent in adhesiveness and chemical resistance by combining with a non-condensed thermoplastic resin using the surface-treated metal sheet for non-condensed thermoplastic resin bonding. Therefore, the composite member is useful for various purposes of use such as automobile components, domestic appliances, architectural materials, and office automation equipment.

EXAMPLES

Hereafter, the present invention will be described in further detail by way of examples. However, the following examples do not limit the present invention, and it is all encompassed within the scope of the present invention to carry out the present invention by making changes within a range that does not depart from the gist of the present invention. Also, unless specifically mentioned, "parts" denotes "parts by mass", and "%" denotes "mass %".

First, a method of measurement and evaluation used in the examples will be described below.

(Ethylene-Acrylic Acid Copolymer)
<Acrylic Acid Content>

A press sheet having a thickness of 0.3 mm was prepared, and the absorbance of the characteristic absorption of a carbonyl group (C=O) appearing around 1700 cm$^{-1}$ of a measured infrared absorption spectrum was corrected with the thickness of the press sheet, so as to measure the amount of structural units deriving from the acrylate by the calibration line method. The acrylic acid content of the ethylene-acrylic acid copolymer was determined on the basis of the amount of structural units deriving from the acrylate.

<MFR>

The MFR of the ethylene-acrylic acid copolymer was measured under the conditions of 190° C. and 2.16 kg load in accordance with ISO 1133.

<Mw>

The Mw of the ethylene-acrylic acid copolymer was calculated using the value of the MFR measured by the above-described method and the formula of Mw=(MFR)$^{-(1/3.4)}$×3.0×10$^5$. Here, as the Mw, Table 1 shows a numerical value obtained by rounding off the calculated value to the nearest hundred.

(Adhesiveness (Adhesive Strength))
<Adhesiveness (Initial Adhesive Strength)>

In a composite member obtained by a production method described later, the end of the surface-treated metal sheet as viewed in the longitudinal direction and the end of the resin layer as viewed in the longitudinal direction were held with a chuck of a tensile tester in an atmosphere of 25° C. and pulled at a tensile speed of 10 mm/min. The tensile strength at which the surface-treated metal sheet and the resin layer were fractured was measured, and the obtained value was determined as the initial adhesive strength. Here, the end of the surface-treated metal sheet as viewed in the longitudinal direction is an end on the side that is not covered with the resin layer, and the end of the resin layer as viewed in the longitudinal direction is an end on the side to which the surface-treated metal sheet is not bonded.

<Chemical Resistance (Adhesive Strength After Immersion into Chemical Agent)>

The adhesive strength was measured in the same manner as described above after the composite member was immersed into a 10% aqueous solution of caustic soda for 168 hours, and the obtained value was determined as the adhesive strength after immersion into 10% aqueous solution of caustic soda. With respect to 95% acetone, 50% ethanol, and 10% aqueous solution of sodium chloride as well, the adhesive strength was measured after immersion for 168 hours in the same manner as the 10% aqueous solution of caustic soda, and the obtained values were determined as the adhesive strength after immersion into 95% acetone, the adhesive strength after immersion into 50% ethanol, and the adhesive strength after immersion into 10% aqueous solution of sodium chloride, respectively. The adhesive strength obtained by these processes was determined as the adhesive strength after immersion into a chemical agent.

Example 1

[Chemical Conversion Coating Film-Forming Coating Liquid]

Into an autoclave of 100 ml, 30 g of ethylene-acrylic acid copolymer (acrylic acid content: 15%, MFR=25 g/10 min), 20 g of 5% ammonia water, 100 g of pure water, 30 g of colloidal silica, and 6.7 g of a silane coupling agent were added, and the mixture was stirred for two hours at a temperature of 140° C. and a stirring speed of 500 rpm, thereby to obtain a chemical conversion coating film-forming coating liquid. As the colloidal silica, SNOWTEX (registered trademark) 40 (having a surface area average particle size of 10 to 20 nm) manufactured by Nissan Chemical Industries, Ltd. was used. As the silane coupling agent, KBM903 (γ-aminopropyltrimethoxysilane) manufactured by Shin-Etsu Chemical Co., Ltd. was used. The composition of the chemical conversion coating film-forming coating liquid (the added amount is a value in terms of solid components) as well as the acrylic acid content and the MFR of the ethylene-acrylic acid copolymer resin are shown in Table 1. Here, the content in Table 1 is a content ratio as determined when the amount of the total solid components of the chemical conversion coating film-forming coating liquid is regarded as 100 mass %. Also, this content ratio is approximately equal to the content ratio as determined when the amount of the chemical conversion coating film is regarded as 100 mass %.

[Chemical Conversion Coated Metal Sheet]

The chemical conversion coating film-forming coating liquid was applied onto a surface of a hot-dip galvannealed steel sheet having a thickness of 1.0 mm so that the coating amount would be 0.5 g/m$^2$ in terms of dry mass, followed by heating at 100° C. for one minute to obtain a chemical conversion coated metal sheet provided with the chemical conversion coating film.

[Surface-Treated Metal Sheet]

UNISTOLE (registered trademark) R-300 manufactured by Mitsui Chemicals, Inc., which was an acid-modified polypropylene adhesive, was applied onto the chemical conversion coating film of the chemical conversion coated metal sheet with use of a bar coater so that the thickness would be 20 μm, followed by heating at 220° C. for two minutes to obtain a surface-treated metal sheet provided with the chemical conversion coating film and the adhesive layer.

[Composite Member]

Next, injection molding was carried out with use of an injection molding machine (PNX60 manufactured by Nissei Plastic Industrial Co., Ltd.). First, the above surface-treated metal sheet was cut into a size of 100 mm×25 mm and put into a mold. Thereafter, Prime Polypro (registered trademark) V7000 manufactured by Prime Polymer Co., Ltd., which is a polypropylene resin containing 20 mass % of glass fibers, was melted, so as to obtain a composite member provided with a resin layer having a size of 100 mm length×25 mm width×3 mm thickness. However, the resin was bonded so that the surface of the surface-treated metal sheet would not be completely covered with the resin layer. The resin was bonded so that the resin layer and the surface-treated metal sheet would overlap with each other at 12.5 mm length×25 mm width (so as to cover only a part of the surface of the surface-treated metal sheet with the resin layer), thereby to obtain a composite member. The injection conditions are shown in Table 2. Also, the initial adhesive strength of the composite members and the adhesive strength after immersion into the above respective chemical agents are shown in Table 1.

Examples 2, 3 and Comparative Examples 1 to 3

A composite member was obtained in the same manner as in Example 1 except that an ethylene-acrylic acid copolymer having an acrylic acid content ratio and an MFR shown Table 1 was used. The initial adhesive strength of the composite members and the adhesive strength after immersion into the above respective chemical agents are shown in Table 1.

TABLE 2

| | | |
|---|---|---|
| Molding machine | | Injection molding machine PNX60 manufactured by Nissei Plastic Industrial Co., Ltd. |
| Shape of molded article | | 100 × 25 × 3.0 mm (Insert side: 0.8 mmt) |
| Cylinder temperature (° C.) | Nozzle | 240 |
| | Front part | 250 |
| | Central part | 250 |
| | Rear part | 240 |
| | Rearmost part | 230 |
| Mold temperature (° C.) | | 45 to 55 |
| Injection pressure | Limit pressure (MPa) | 40 |
| | Holding pressre (MPa) | 50 |
| | Filling speed (mm/s) | 10 |
| | Rotation speed of screw (rpm) | 80 |
| | Back pressure (MPa) | 5 |
| Settings | Injection pressure-holding time (s) | 6.5 |
| | Cooling time (s) | 25 |
| | Intermediate time (s) | 0.3 |
| | Metering finishing position (mm) | 30 |
| | V-P switching position (mm) | 7.5 |
| Actual measurement | Metering (s) | 7.38 |
| | Packing (s) | 2.47 |
| | 1 cycle (s) | — |

From Table 1, studies can be made as follows.

Composite members obtained by using the chemical conversion coated metal sheets of Examples 1 to 3 satisfying the constitutional requirements of the present invention were excellent in adhesive strength and chemical resistance.

In contrast, the chemical conversion coated metal sheets other than those described above did not satisfy the constitutional requirements of the present invention, and hence desired characteristics could not be obtained, as will be described in detail in the following.

In the composite member obtained by using the chemical conversion coated metal sheet of Comparative Example 1 containing an ethylene-acrylic acid copolymer in which the acrylic acid content was too small, the adhesive strength and the chemical resistance were poor.

Also, in the composite members obtained by using the chemical conversion coated metal sheets of Comparative Examples 2 and 3 containing an ethylene-acrylic acid copo-

TABLE 1

| | Chemical conversion coating film | | | | | | Adhesive strength | | | | |
|---|---|---|---|---|---|---|---|---|---|---|---|
| | Ethylene-acrylic acid copolymer | | | | | Silane | | 10% aqueous solution | | | 10% aqueous solution |
| | Content ratio (%) | Acrylic acid content (%) | MFR (g/10 min) | Mw (—) | Colloidal silica (%) | coupling agent (%) | Initial state (MPa) | of caustic soda (MPa) | 95% acetone (MPa) | 50% ethanol (MPa) | of sodium chloride (MPa) |
| Example 1 | 45 | 15 | 25 | 116400 | 45 | 10 | 12.3 | 11.5 (94) | 11.6 (93) | 10.8 (87) | 10.6 (87) |
| Example 2 | | 12 | 14 | 138000 | | | 11.9 | 10.8 (91) | 10.9 (92) | 10.1 (86) | 10.0 (85) |
| Example 3 | | 15 | 60 | 90000 | | | 11.5 | 10.8 (93) | 10.9 (94) | 10.1 (86) | 10.0 (86) |
| Comparative Example 1 | | 4 | 14 | 138000 | | | 8.9 | 7.4 (82) | 7.5 (83) | 6.7 (74) | 6.5 (74) |
| Comparative Example 2 | | 15 | 100 | 77400 | | | 10.1 | 9.4 (94) | 9.5 (94) | 8.7 (85) | 8.5 (83) |
| Comparative Example 3 | | 10 | 500 | 48200 | | | 9.9 | 8.8 (88) | 8.9 (89) | 8.1 (82) | 7.9 (81) |

Numerical value in parentheses represents percentage of adhesive strength relative to initial adhesive strength.

lymer in which the MFR was too large, the adhesive strength and the chemical resistance were poor.

This application is based on Japanese Patent Application No. 2016-067172 filed on Mar. 30, 2016, the contents of which are incorporated in the present application.

While the present invention has been fully and appropriately described in the above by way of embodiments in order to express the present invention, it is to be recognized that those skilled in the art can readily change and/or modify the embodiments described above. Therefore, it is to be interpreted that the changes or modifications made by those skilled in the art are encompassed within the scope of the claims unless those changes or modifications are at a level that departs from the scope of the claims described in the claims section of the present application.

INDUSTRIAL APPLICABILITY

According to the present invention, there is provided a chemical conversion coated metal sheet for non-condensed thermoplastic resin bonding, the chemical conversion coated metal sheet being useful as a material to be formed into a composite member excellent in adhesiveness and chemical resistance. Also, according to the present invention, there is provided a surface-treated metal sheet for non-condensed thermoplastic resin bonding in which an adhesive layer is provided on a surface of the chemical conversion coated metal sheet for non-condensed thermoplastic resin bonding. Further, according to the present invention, there is provided a composite member excellent in adhesiveness and chemical resistance by combining with a non-condensed thermoplastic resin using the chemical conversion coated metal sheet for non-condensed thermoplastic resin bonding. Therefore, the composite member is useful for various purposes of use such as automobile components, domestic appliances, architectural materials, and office automation equipment.

The invention claimed is:

1. A chemical conversion coated metal sheet comprising a metal substrate and a chemical conversion coating film disposed on at least one surface of the metal substrate, wherein the chemical conversion coating film is obtained by coating the metal substrate with a coating liquid comprising an ethylene-acrylic acid copolymer, a colloidal silica, and a silane coupling agent, the ethylene-acrylic acid copolymer has an acrylic acid content of 10 mass % or more and a melt flow rate of 80 g/10 min or less, and a content of the ethylene-acrylic acid copolymer is 99.91 mass % or more of a total resin contained in the chemical conversion coating film.

2. The chemical conversion coated metal sheet of claim 1, wherein the ethylene-acrylic acid copolymer has a weight-average molecular weight of 80,000 or more.

3. The chemical conversion coated metal sheet of claim 1, wherein a coating amount of the chemical conversion coating film is 0.05 to 5 $g/m^2$ in terms of dry mass.

4. The chemical conversion coated metal sheet of claim 1, wherein the chemical conversion coated metal sheet is suitable for non-condensed thermoplastic resin bonding.

5. A surface-treated metal sheet comprising the chemical conversion coated metal sheet of claim 1 and an adhesive layer disposed on a part or a whole of a surface of the chemical conversion coating film, the adhesive layer comprising an adhesive comprising a resin comprising a polar group.

6. A composite member comprising the surface-treated metal sheet of claim 5 and a resin layer disposed on the adhesive layer, the resin layer comprising a non-condensed thermoplastic resin.

7. The composite member of claim 6, wherein the non-condensed thermoplastic resin comprises a polyolefin resin.

8. A method for producing the chemical conversion coated metal sheet of claim 1, the method comprising forming the chemical conversion coating film through applying a chemical conversion coating film-forming coating liquid onto at least one surface of the metal substrate, wherein the chemical conversion coating film-forming coating liquid comprises the ethylene-acrylic acid copolymer, the colloidal silica, and the silane coupling agent.

* * * * *